United States Patent
Sakurai

(10) Patent No.: US 11,560,497 B2
(45) Date of Patent: Jan. 24, 2023

(54) ADHESIVE SHEET

(71) Applicant: 3M INNOVATIVE PROPERTIES COMPANY, Saint Paul, MN (US)

(72) Inventor: Aizoh Sakurai, Tokyo (JP)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 651 days.

(21) Appl. No.: 15/573,328

(22) PCT Filed: May 20, 2016

(86) PCT No.: PCT/US2016/033410
§ 371 (c)(1),
(2) Date: Nov. 10, 2017

(87) PCT Pub. No.: WO2016/191236
PCT Pub. Date: Dec. 1, 2016

(65) Prior Publication Data
US 2018/0127622 A1    May 10, 2018

(30) Foreign Application Priority Data
May 28, 2015    (JP) .............................. JP2015-108789

(51) Int. Cl.
| | | |
|---|---|---|
| *C09J 7/50* | (2018.01) | |
| *C09J 7/38* | (2018.01) | |
| *C09J 183/04* | (2006.01) | |
| *C09J 133/14* | (2006.01) | |
| *C08L 83/04* | (2006.01) | |
| *C09J 7/30* | (2018.01) | |
| *C09J 7/22* | (2018.01) | |
| *C09J 7/25* | (2018.01) | |
| *C09D 133/10* | (2006.01) | |
| *C09D 133/00* | (2006.01) | |

(52) U.S. Cl.
CPC .............. *C09J 7/387* (2018.01); *C08L 83/04* (2013.01); *C09D 133/10* (2013.01); *C09J 7/22* (2018.01); *C09J 7/255* (2018.01); *C09J 7/30* (2018.01); *C09J 7/50* (2018.01); *C09J 133/14* (2013.01); *C09J 183/04* (2013.01); *C09D 133/00* (2013.01); *C09J 2427/006* (2013.01); *C09J 2433/003* (2013.01); *C09J 2471/003* (2013.01); *C09J 2483/00* (2013.01); *Y10T 428/2809* (2015.01); *Y10T 428/2843* (2015.01); *Y10T 428/2848* (2015.01); *Y10T 428/31536* (2015.04)

(58) Field of Classification Search
CPC .............. C09D 171/02; C09D 133/14; C09D 133/18; C08L 71/02; C08L 33/14; C08L 33/18
See application file for complete search history.

(56) References Cited

U.S. PATENT DOCUMENTS

| | | | |
|---|---|---|---|
| 5,047,294 A | 9/1991 | Schwab | |
| 6,210,758 B1* | 4/2001 | McNeil | B05D 7/57 427/409 |
| 6,479,724 B1 | 11/2002 | Areskoug | |
| 6,524,675 B1* | 2/2003 | Mikami | B44C 1/105 428/40.1 |
| 7,199,183 B2 | 4/2007 | Okuyama | |
| 7,569,278 B2 | 8/2009 | Utesch | |
| 8,603,630 B2 | 12/2013 | Takahashi | |
| 2002/0114955 A1 | 8/2002 | Lamers | |
| 2003/0152767 A1* | 8/2003 | Hawkins | C08K 5/3492 428/353 |
| 2004/0185258 A1 | 9/2004 | Fukushi | |
| 2004/0249061 A1* | 12/2004 | Sunkara | C08G 18/4063 524/589 |
| 2005/0175818 A1 | 8/2005 | Kawabata | |
| 2007/0031660 A1* | 2/2007 | Kanamaru | B32B 7/12 428/355 AC |
| 2007/0071969 A1 | 3/2007 | Kontani et al. | |
| 2011/0030887 A1 | 2/2011 | Husemann et al. | |
| 2012/0114953 A1 | 5/2012 | Ogawa | |
| 2013/0045379 A1 | 2/2013 | Yasuda | |
| 2013/0330544 A1 | 12/2013 | Toyama | |
| 2014/0110048 A1 | 4/2014 | Ogawa | |
| 2014/0349108 A1 | 11/2014 | Fung | |
| 2015/0044456 A1 | 2/2015 | Chien | |

FOREIGN PATENT DOCUMENTS

| | | | |
|---|---|---|---|
| EP | 1458833 | 7/2011 | |
| JP | H08-333554 A | 12/1996 | |
| JP | 2000280283 A | 10/2000 | |
| JP | 2006-335948 A | 12/2006 | |
| JP | 2009-155306 A | 7/2009 | |
| JP | 2011-219549 | 11/2011 | |
| JP | 2012-214585 A | 11/2012 | |
| JP | 2013-254156 | 12/2013 | |
| WO | WO 00/69985 | 11/2000 | |
| WO | WO-02100961 A1 * | 12/2002 | ......... C09D 133/064 |
| WO | WO 03/000814 | 1/2003 | |
| WO | WO 2005/102403 | 11/2005 | |

(Continued)

OTHER PUBLICATIONS

International Search Report for PCT International Application No. PCT/US2016/033410, dated Aug. 24, 2016, 3 pages.
International Search Report for PCT International Application No. PCT/US2016/033408, dated Aug. 24, 2016, 3 pages.
Supplementary European Search Report for EP16800522 dated Dec. 13, 2018.
Supplementary European Search Report for EP16800523 dated Nov. 9, 2018.

(Continued)

*Primary Examiner* — Anish P Desai
(74) *Attorney, Agent, or Firm* — 3M Innovative Properties Company

(57) ABSTRACT

An adhesive sheet comprising a base material, a primer layer, and an adhesive layer cured by radiation, arranged in this order. The primer layer comprises a (meth)acrylic polymer having a nitrogen-containing group and a polymer having a polyoxyalkylene group.

8 Claims, No Drawings

(56) References Cited

FOREIGN PATENT DOCUMENTS

| WO | WO 2008/057155 | 5/2008 |
| WO | WO 2010/056543 | 5/2010 |
| WO | WO 2010/056544 | 5/2010 |
| WO | WO 2012/091167 | 7/2012 |
| WO | WO 2013/096535 | 6/2013 |
| WO | WO 2013/116130 | 8/2013 |
| WO | WO 2016/191236 | 12/2016 |

* cited by examiner

ADHESIVE SHEET

CROSS REFERENCE TO RELATED APPLICATIONS

This application is a national stage filing under 35 U.S.C. 371 of PCT/US2016/033410, filed May 20, 2016, which claims the benefit of Japanese Application No. 2015-108789, filed May 28, 2015, the disclosures of which are incorporated by reference in their entirety herein.

FIELD OF THE INVENTION

The present invention relates to an adhesive sheet.

BACKGROUND

Various types of adhesive agents, such as acrylic-based, silicone-based, and natural rubber-based adhesive agents, have been known as adhesive agents that constitute adhesive sheets. Adhesive agents may be subjected to crosslinking for use; and radiation curing may be used as a method of crosslinking.

SUMMARY

For cases where the adhesive sheet is provided as a laminate, when each sheet is taken out, an adhesive layer is sometimes separated from its base material and remains on a base material of an adjacent sheet in the laminate. Furthermore, when the adhesive sheet is temporarily attached to an adherend, such as skin, and then peeled off, its adhesive layer and base material could be separated upon the peeling, thereby leaving only the adhesive layer on the adherend. To ensure sufficient anchoring characteristics (hereinafter, also referred to as "anchoring effect") between a base material and an adhesive layer, an adhesive sheet may be provided with a primer layer sandwiched between the base material and the adhesive layer.

The present invention provides an adhesive sheet comprising: a base material, a primer layer, and an adhesive layer cured by radiation, arranged in this order; the primer layer containing a (meth)acrylic polymer having a nitrogen-containing group and a polyoxyalkylene polymer. Note that "(meth)acryl" refers to "acryl" or "methacryl", and this also applies to similar expressions such as "(meth)acrylate".

The adhesive sheet according to the present invention exhibits excellent anchoring characteristics between a base material and an adhesive layer, and even after being stored for a long period of time, the base material and the adhesive layer are not likely to separate when the adhesive sheet is peeled off.

DETAILED DESCRIPTION

An embodiment of the present invention will be described in detail below.

An embodiment of the present invention is an adhesive sheet comprising: a base material, a primer layer, and an adhesive layer cured by radiation, arranged in this order; the primer layer containing a (meth)acrylic polymer having a nitrogen-containing group and a polymer having a polyoxyalkylene group (hereinafter, also referred to as "polyoxyalkylene polymer").

The base material is a supporting body that supports the primer layer and the adhesive layer, and the overall shape thereof can be, for example, a film shape or roll shape. As the base material, in addition to flat materials that have no holes or unevenness, fiber-like materials, mesh-like materials, materials with holes, materials with unevenness, such as an embossed pattern, on surfaces thereof, or the like can be used depending on the application target and/or intended use. Examples of the material that constitutes the base material include polyurethanes, polyesters, and polyvinyl chlorides. Examples of the polyester include polyethylene terephthalates.

The (meth)acrylic polymer having a nitrogen-containing group contained in the primer layer is a polymer having, as a monomer unit, a monomer containing a (meth)acryloyl group. This polymer may be a homopolymer or copolymer. Here, the nitrogen-containing group is a functional group having a nitrogen atom, and this functional group may be a hydrophilic functional group. Examples of the nitrogen-containing group include amino groups, amide groups, and imide groups. For cases where the nitrogen-containing group can undergo substitution, such as amino groups and amide groups, the nitrogen-containing group may be substituted with, for example, an alkyl group having from 1 to 22 carbons. This alkyl group may be further substituted with a polyoxyalkylene group, polyaminoalkylene group, or the like, and the alkylene group may be, for example, an alkylene group having from 2 to 4 carbons. Note that the nitrogen-containing group may be in a form of salt such as an onium salt.

The nitrogen-containing group may be arranged at any position in the (meth)acrylic polymer. The monomer unit constituting the (meth)acrylic polymer is described as follows: in the case of amino groups and amide groups, the nitrogen-containing group may be directly bonded to the (meth)acryloyl group or may be present by bonding to a group that has been bonded to the (meth)acryloyl group (for example, alkyl group). For cases where the nitrogen-containing group is an imide group, the nitrogen-containing group is present at a non-terminal moiety of the monomer unit. Such a monomer can be obtained by, for example, reacting a (meth)acrylic acid with a hydroxyalkyl imide obtained by reacting a cyclic acid anhydride with amino alkyl alcohol.

The weight average molecular weight of the (meth)acrylic polymer having a nitrogen-containing group may be from 5,000 to 1,000,000, or may be from 10,000 to 100,000. Furthermore, the amine hydrogen equivalent may be from 300 to 2,000 (g solid/eq).

The (meth)acrylic polymer having a nitrogen-containing group is preferably a (meth)acrylate polymer having an amino group. This (meth)acrylate polymer having an amino group may be a copolymer having, as monomer units, a (meth)acrylic monomer having an amino group and a (meth)acrylic acid ester. Note that the (meth)acrylic monomer having an amino group, which is a monomer unit, is preferably in a form where an amino group is bonded to an alkyl group that has been bonded to a (meth)acryloyl group (i.e. aminoalkyl (meth)acrylate).

Examples of the (meth)acrylate polymer having a nitrogen-containing group include polymers having, as a monomer unit, a compound represented by general formula (1) or general formula (2) below.

[Formula 1]

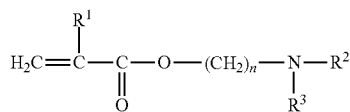

(1)

In the formula, $R^1$ represents a methyl group or a hydrogen atom; $R^2$ and $R^3$ each independently represent an alkyl group having from 1 to 22 carbons or a hydrogen atom; and n represents an integer of 1 to 100.

[Formula 2]

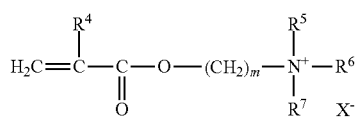

(2)

In the formula, $R^4$ represents a methyl group or a hydrogen atom; $R^5$, $R^6$, and $R^7$ each independently represent an alkyl group having from 1 to 22 carbons or a hydrogen atom; $X^-$ represents a counterion; and m represents an integer of 1 to 100. Examples of the counterion include a hydroxide ion, halide ion, sulfate ion, nitrate ion, sulfonate ion, phosphate ion, and alkoxy ion.

Specific examples of the (meth)acrylate polymer having an amino group include N,N-dimethylaminoethyl (meth)acrylate and N,N-diethylaminoethyl (meth)acrylate. Specific examples of the (meth)acrylate polymer having an ammonium group include 2-hydroxy-3-(meth)acryloyloxy propyl trimethylammonium chloride, and 2-hydroxy-3-(meth)acryloyloxy propyl triethanolammonium chloride.

Furthermore, the (meth)acrylate polymer having a nitrogen-containing group may be a polymer having a structural unit represented by general formula (3) below.

[Formula 3]

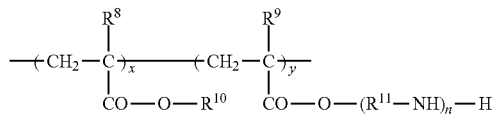

(3)

In the formula, $R^8$ and $R^9$ are each independently a methyl group or a hydrogen atom; $R^{10}$ is an alkyl group having from 1 to 22 carbons; $R^{11}$ is an alkylene group having from 2 to 4 carbons; x is an integer from 0 to 2,000; y is an integer from 1 to 2,000; and n is an integer from 1 to 100. $R^{10}$ may be an alkyl group having from 1 to 18 carbons; and $R^{11}$ may be an alkylene group having 2 carbons. x is preferably from 0 to 1,500; y is preferably from 50 to 1,500; and x and y may be numbers such that the sum of x and y is from 100 to 1,500.

The primer layer contains not only the (meth)acrylic polymer having a nitrogen-containing group but also a polyoxyalkylene polymer. This polyoxyalkylene polymer may have any functional group at the terminal of the polymer as long as the polyoxyalkylene polymer has a polyoxyalkylene group. The functional group at the terminal may be a hydroxy group, alkoxy group, acyloxy group, aryloxy group, or the like. The polyoxyalkylene group of this polyoxyalkylene polymer is preferably a polyoxypropylene group and/or a polyoxyethylene polyoxypropylene group.

The number average molecular weight of the polyoxyalkylene polymer is preferably from 500 to 15,000, more preferably from 1,000 to 10,000, and even more preferably from 1,500 to 5,000.

The content of the oxyethylene unit of the polyoxyethylene polyoxypropylene polyol is preferably 80 or less, more preferably 60 or less, and even more preferably 50 or less, relative to the total mass. In other words, in the polyoxyethylene polyoxypropylene polyol, the mass of the oxypropylene unit relative to the mass of the oxyethylene unit is preferably 0.25 or greater, more preferably 0.66 or greater, and even more preferably 1.0 or greater.

The polyoxyalkylene polymer may be bi- to hexa-functional. Here, "bi- to hexa-functional" refers to a condition where two to six functional groups are contained in a molecule. Examples of the functional groups include hydroxy groups, alkoxy groups, acyloxy groups, and aryloxy groups. These polyoxyalkylene polymers are preferably bi- or tri-functional, and it is also possible to use only bifunctional polyoxyalkylene polymers. Furthermore, the polyoxyalkylene polymers may be a mixture of bifunctional polyoxyalkylene polymers and trifunctional polyoxyalkylene polymers. Note that the molecular shape may be linear or branched.

Specific examples include polyoxyethylene glycol, polyoxypropylene glycol, polyoxyethylene polyoxypropylene glycol, polyoxyethylene methyl ether, polyoxypropylene butyl ether, polyoxyethylene lauryl ether, polyoxyethylene cetyl ether, polyoxyethylene oleyl ether, polyoxyethylene stearyl ether, polyoxyethylene tridecyl ether, polyoxyethylene myristyl ether, polyoxyethylene isostearyl ether, polyoxyethylene behenyl ether, polyoxyethylene octyldodecyl ether, polyoxyethylene cholesteryl ether, polyoxypropylene monomethyl ether, polyoxypropylene monoethyl ether, polyoxypropylene monopropyl ether, polyoxypropylene monobutyl ether, polyoxypropylene myristyl ether, polyoxypropylene cetyl ether, polyoxypropylene stearyl ether, polyoxypropylene lanolin ether, polyoxyethylene polyoxypropylene monobutyl ether, polyoxyethylene polyoxypropylene lauryl ether, polyoxyethylene polyoxypropylene cetyl ether, polyoxyethylene polyoxypropylene stearyl ether, polyoxyethylene polyoxypropylene decyltetradecyl ether, polyoxyethylene methylglucoside, polyoxypropylene methylglucoside, polyethylene glycol monolaurate, polyethylene glycol monooleate, polyethylene glycol monostearate, polyethylene glycol monomyristate, polyethylene glycol monoisostearate, polypropylene glycol monolaurate, polypropylene glycol monooleate, polyethylene glycol dilaurate, polyethylene glycol dipalmitate, polyethylene glycol dioleate, polypropylene glycol distearate, polyethylene glycol diisostearate, polypropylene glycol dilaurate, polyoxyethylene myristyl ether myristate, polyoxyethylene cetyl ether stearate, and polyoxyethylene stearyl ether stearate.

The hydroxyl equivalent of the polyoxyalkylene polymer is preferably from 250 to 7,500 g/eq, more preferably from 500 to 5,000 g/eq, and even more preferably from 750 to 2,000 g/eq. Here, "hydroxyl equivalent" is a value obtained by dividing the molecular weight of the low molecular weight polyol by the number of hydroxy groups. Furthermore, the hydroxyl equivalent can be calculated from hydroxyl value according to the following formula.

(Hydroxyl equivalent)=(Molecular weight of low molecular weight polyol)/{(Hydroxyl value)/56× 17}

Note that the hydroxyl value is a value obtained in accordance with JIS K1557-1:2007, and, for example, means the amount, in milligram (mg), of potassium hydroxide (molecular weight: 56) that is equivalent to the amount of hydroxy group in 1 g of the low molecular weight polyol.

The polyoxyalkylene polymer may be a random copolymer or a block copolymer. When the polyoxyethylene polyoxypropylene polyol is a block copolymer, a triblock copolymer may have a structure formed with polyoxyethylene-polyoxypropylene-polyoxyethylene (POE-POP-POE) or polyoxypropylene-polyoxyethylene-polyoxypropylene (POP-POE-POP).

In the present embodiment, the content of the polyoxyalkylene polymer in the primer layer is, in terms of mass, from 0.1 to 10 times, from 0.2 to 5 times, or from 0.3 to 3 times, the content of the (meth)acrylic polymer having a nitrogen-containing group.

Note that the primer layer may further contain additive components, such as surfactants and UV absorbing agents, in the range that does not impair the object of the present invention.

The adhesive sheet of the first embodiment comprises the adhesive layer cured by radiation. "Radiation" refers to radiation (ionizing radiation) that exhibits a high energy beam such as an electron beam or gamma rays, and does not refer to non-ionizing radiation such as ultraviolet light. Examples of the adhesive agent that forms the adhesive layer include silicone-based adhesive agents (for example, agents in which silicone-based tackifier such as MQ resin has been added to polyorganosiloxane), acrylic-based adhesive agents, and the like. In the present embodiment, silicone-based adhesive agents are particularly effective.

The adhesive layer may be formed from an adhesive agent that has high molecular weight sufficient to exhibit adhesion before curing the layer via radiation, or may use a material that exhibits adhesion only after the molecular weight thereof is increased via irradiation. For the latter case, the adhesive layer is in a monomeric or oligomeric state prior to the radiation curing; and elongation, crosslinking, or the like of the molecular chain occurs upon the irradiation.

When an adhesive layer cured by radiation is provided on a primer layer, a method that laminates an adhesive layer that has been cured by an electron beam on a primer layer, or a method that laminates an adhesive layer on a primer layer and then cures the adhesive agent by irradiating the entire assembly with an electron beam can be used. The latter method is preferably employed since the latter method allows generation of radicals from the adhesive agent via irradiation and allows the radicals to react with a component that constitutes the primer layer, thereby achieving superior anchoring characteristics.

The adhesive sheet according to the present embodiment can be produced by the following method, for example.

Specifically, a primer composition containing a (meth) acrylic polymer having a nitrogen-containing group and a polyoxyalkylene polymer is prepared. Then, this primer composition is spread over a base material to form a primer layer on the surface of the base material. In this case, heating may be performed. Thereafter, an adhesive agent is spread over the primer layer, and cured by irradiation to obtain an adhesive sheet. The obtained adhesive sheet may further comprise a release liner (same applies for other embodiments).

For the adhesive sheet of the present embodiment, superior anchoring effect is exhibited when the material of the base material is polyvinyl chloride.

EXAMPLES

The present invention will be described more in detail with reference to working examples and comparative examples.

Experimental Example 1

<Preparation of Primer Compositions P1 to P8>

To a methyl ethyl ketone solution of polyoxyalkylene polymer 1, an acrylate polymer 1 was added at a proportion described in Table 1, and mixed well. In this manner, primer compositions P1 to P3 were prepared. Primer composition P4 was prepared in the same manner as for the primer composition P2 except for using a polyoxyalkylene polymer 2 in place of the polyoxyalkylene polymer 1. Primer composition P5 was prepared in the same manner as for the primer composition P2 except for using a polyoxyalkylene polymer 3 in place of the polyoxyalkylene polymer 1. Primer composition P6 was prepared in the same manner as for the primer composition P2 except for using a polyoxyalkylene polymer 4 in place of the polyoxyalkylene polymer 1.

As primer composition P7, a solution was prepared by diluting the polyoxyalkylene polymer 1 with a mixed solvent of toluene and isopropyl alcohol (70:30). As primer composition P8, a solution was prepared by diluting the acrylate polymer 1 with a mixed solvent of toluene and isopropyl alcohol (70:30). Note that, in Table 1, the amount of polyoxyalkylene polymer 1 is described in terms of the hydroxyl equivalent. Furthermore, when the primer compositions P1 to P8 were prepared, the amount of the methyl ethyl ketone was adjusted so that the total concentration of the polyoxyalkylene polymer 1 to 4 and the acrylate polymer 1 became 10% by mass.

TABLE 1

|  | P1 | P2 | P3 | P4 | P5 | P6 | P7 | P8 |
|---|---|---|---|---|---|---|---|---|
| Polyoxyalkylene polymer 1 | 35 | 50 | 65 | — | — | — | 100 | — |
| Polyoxyalkylene polymer 2 | — | — | — | 50 | — | — | — | — |
| Polyoxyalkylene polymer 3 | — | — | — | — | 50 | — | — | — |
| Polyoxyalkylene polymer 4 | — | — | — | — | — | 50 | — | — |
| Acrylate polymer 1 | 65 | 50 | 35 | 50 | 50 | 50 | — | 100 |

Polyoxyalkylene polymer 1: CM-294 (trade name; manufactured by Adeka Corporation) was used. CM-294 is a triblock copolymer having a number average molecular weight of approximately 2,900 g/mol; its ratio of the oxyethylene unit to the oxypropylene unit is 40:60; and the hydroxyl equivalent thereof is 1,450 g/eq. Polyoxyalkylene polymer 2: UNISAFE NKL-9520 (trade name; manufactured by NOF Corporation) was used. UNISAFE NKL-9520 is a polypropylene glycol-distearate having a molecular weight of 2,500.

Polyoxyalkylene polymer 3: UCON-50-HB-400 (trade name; manufactured by The Dow Chemical Company) was used. UCON-50-HB-400 is a triblock copolymer having a molecular weight of 1230, and is a polyoxyethylene oxypropylene-monobutylether having a mass ratio of the oxyethylene to the oxypropylene of 50:50 (or 57:43, when converted into a ratio of the oxyethylene unit to the oxypropylene unit).

Polyoxyalkylene polymer 4: UNILUB 50 MB-72 (trade name; manufactured by NOF Corporation) was used. UNILUB 50 MB-72 is a triblock copolymer having an average molecular weight of 3,000, and is a polypropylene glycol-monobutyl ether having a ratio of the oxyethylene unit to the oxypropylene unit of 50:50.

Acrylate polymer 1: Polyment NK-350 (trade name; manufactured by Nippon Shokubai Co., Ltd.) having a structure of general formula (1) was used.

<Preparation of Adhesive Sheet>
(1) Coating of Primer to Base Material

On a plasticized polyvinyl chloride base material, one of the primer compositions P1 to P5 was spread using a wire bar (manufactured by Marukyo Giken K.K.; Wire bar #5) and heated in an oven at 60° C. for 2 minutes to coat the base material surface with a primer layer.

(2) Preparation of Adhesive Agent Composition

To 100 parts by mass of silanol-terminated polydimethylsiloxane (trade name: TSF451-100M; manufactured by Momentive Performance Materials Japan LLC), 30 parts by mass of MQ resin (trade name: MQ803TF; manufactured by Wacker Chemie AG) was added as a tackifier to prepare a silicone-based adhesive agent composition.

(3) Preparation of Adhesive Sheet

On the primer of the base material formed from the plasticized polyvinyl chloride coated with the primer composition described above, or on a base material formed from a plasticized polyvinyl chloride that has not been treated with a primer, the silicone-based adhesive agent composition described above was spread using a knife coater in a manner that the thickness of the adhesive layer became 50 μm. Thereafter, the adhesive agent composition was immediately cured by irradiating the silicone-based adhesive agent composition, which was spread, with an electron beam (40 KGy) using an electron beam generating device CB300 at an accelerating voltage of 180 keV. A fluorosilicone liner (trade name: K1; manufactured by Fujico Co., Ltd.) was then laminated on the adhesive agent surface. In this manner, adhesive sheets of Working Examples 1 to 4 and Comparative Examples 1 to 3 were produced.

The relation between the obtained adhesive sheets of Working Examples 1 to 6 and Comparative Examples 1 to 3 and the primer compositions P1 to P8 are as described in Table 2. Note that the adhesive sheet of Comparative Example 1 had no primer layer.

TABLE 2

|  | Primer layer | Material of base material |
|---|---|---|
| Working Example 1 | P1 | Polyvinyl chloride |
| Working Example 2 | P2 | Polyvinyl chloride |
| Working Example 3 | P3 | Polyvinyl chloride |
| Working Example 4 | P4 | Polyvinyl chloride |
| Working Example 5 | P5 | Polyvinyl chloride |
| Working Example 6 | P6 | Polyvinyl chloride |
| Comparative Example 1 | — | Polyvinyl chloride |
| Comparative Example 2 | P7 | Polyvinyl chloride |

TABLE 2-continued

|  | Primer layer | Material of base material |
|---|---|---|
| Comparative Example 3 | P8 | Polyvinyl chloride |

<Anchoring Characteristic Test>

On the surface of the base material of the obtained adhesive sheet, a stainless steel plate was fixed using double-sided adhesive tape (trade name: ST-416; manufactured by 3M), and a fluorosilicone liner was peeled off from the adhesive layer. Thereafter, a piece of silicone tape (trade name: 8403; manufactured by 3M; width: 1 inch) was fixed on the surface of the exposed adhesive layer to obtain a laminate. Then, using a 2 kg roller, each layer of the obtained laminate was sufficiently pressure-bonded. Subsequently, each of the pressure-bonded laminate was stored under one of the following storing conditions 1 to 3. Thereafter, the peel strength (N/inch) for the case where the silicone tape was peeled off at an angle of 180° at a rate of 30 cm/min, and the appearance were evaluated.

Storing condition 1: Temperature: 23° C., for 7 days

Storing condition 2: Temperature: 70° C. (using an oven), for 7 days

Storing condition 3: Temperature: 65° C. (using an oven), relative humidity: 80% RH, for 7 days Evaluation results for the peel strength are shown in Table 3, and evaluation results for the appearance are shown in Table 4. Note that, in Table 4, "A" refers to a condition where the base material and the adhesive layer were completely separated (i.e. any one of anchoring characteristics between the adhesive layer and the base material, between the adhesive layer and the primer layer, or between the primer layer and the base material was insufficient). "B" refers to a condition where the silicone tape and the adhesive layer were completely separated. "C" refers to a condition where the adhesive layer was separated in a manner that the adhesive layer was broken and remained on both the silicone tape and the base material. Furthermore, a numerical value for this evaluation in Table 4 indicates a proportion of the area in which the condition of A, B, or C was observed relative to the area, which was taken to be 10, of the entire contact surface of the base material and the adhesive layer.

TABLE 3

|  | Storing condition 1 | Storing condition 2 | Storing condition 3 |
|---|---|---|---|
| Working Example 1 | 7.4 | 7.6 | 7.7 |
| Working Example 2 | 7.9 | 7.6 | 7.5 |
| Working Example 3 | 7.9 | 7.6 | 7.6 |
| Working Example 4 | 8.2 | 7.8 | 7.6 |
| Working Example 5 | 7.8 | 8.3 | 7.9 |
| Working Example 6 | 7.2 | 7.2 | 7.4 |
| Comparative Example 1 | 1.3 | 4.5 | 4.5 |
| Comparative Example 2 | 7.4 | 6.2 | 4.7 |
| Comparative Example 3 | 1.4 | 5.6 | 6.8 |

TABLE 4

|  | Storing condition 1 | | | Storing condition 2 | | | Storing condition 3 | | |
|---|---|---|---|---|---|---|---|---|---|
|  | A | B | C | A | B | C | A | B | C |
| Working Example 1 | 0 | 0 | 10 | 0 | 6 | 4 | 0 | 2 | 8 |
| Working Example 2 | 0 | 0 | 10 | 0 | 5 | 5 | 0 | 9 | 1 |
| Working Example 3 | 0 | 0 | 10 | 0 | 8 | 2 | 0 | 5 | 5 |
| Working Example 4 | 0 | 0 | 10 | 0 | 0 | 10 | 0 | 0 | 10 |
| Working Example 5 | 0 | 2 | 8 | 0 | 3 | 7 | 0 | 0 | 10 |
| Working Example 6 | 0 | 0 | 10 | 0 | 6 | 4 | 0 | 5 | 5 |
| Comparative Example 1 | 10 | 0 | 0 | 10 | 0 | 0 | 10 | 0 | 0 |
| Comparative Example 2 | 0 | 0 | 10 | 8 | 0 | 2 | 10 | 0 | 0 |
| Comparative Example 3 | 10 | 0 | 0 | 10 | 0 | 0 | 10 | 0 | 0 |

The adhesive sheets of Working Examples 1 to 6 exhibited sufficient anchoring characteristics even after being stored under one of the storing conditions 1 to 3. On the other hand, for the adhesive sheets of Comparative Examples 1 to 3, there were many cases where the base material and the adhesive layer were separated. The adhesive sheets of Comparative Examples 1 to 3 exhibited insufficient anchoring characteristics.

What is claimed is:

1. An adhesive sheet comprising, in order:
   a base material being polyvinyl chloride;
   a primer layer comprising
   a polymer having a polyoxyalkylene group, and
   a (meth)acrylate polymer having an amino group derived from a monomer represented by formula (I):

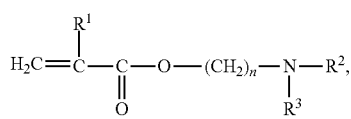

(1)

wherein:
   $R^1$ is —H or —CH$_3$,
   $R^2$ and $R^3$ are independently selected from —H and a $C_{1-22}$ alkyl, and
   n is an integer selected from 1 to 100; and
   a silicone-based adhesive layer,
   wherein curing the adhesive sheet with an electron beam radiation generates radicals within the silicone-based adhesive layer and the radicals react with the primer layer.

2. The adhesive sheet according to claim 1, wherein a content of the polymer having a polyoxyalkylene group is, in terms of mass, from 0.1 to 10 times a content of the (meth)acrylate polymer having an amino group.

3. The adhesive sheet according to claim 1, wherein the polyoxyalkylene group is selected from the group consisting of a polyoxypropylene group, a polyoxyethylene polyoxypropylene group, and combinations thereof.

4. The adhesive sheet according to claim 1, wherein the polyoxyalkylene group is a polyoxyethylene polyoxypropylene group, and wherein the mass of an oxypropylene unit relative to the mass of an oxyethylene unit is 0.25 or greater.

5. The adhesive sheet according to claim 1, wherein the (meth)acrylate polymer having an amino group is further derived from a monomer represented by Formula (2):

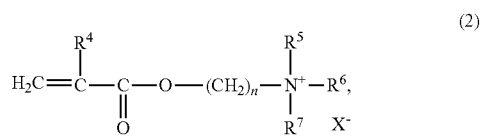

(2)

wherein:
$R^4$ is —H or —CH$_3$,
$R^5$, $R^6$, and $R^7$ are independently selected from —H and a $C_{1-22}$ alkyl,
$X^-$ is selected from alkoxide, halide, hydroxide, nitrate, phosphate, sulfate, sulfonate, and
m is an integer selected from 1 to 100.

6. The adhesive sheet according to claim 1, wherein the (meth)acrylate polymer having an amino group is further derived from a monomer selected from 2-hydroxy-3-(meth)acryloyloxy propyl trimetylammonium chloride and 2-hydroxy-3-(meth)acryloyloxy propyl triethanolammonium chloride.

7. The adhesive sheet according to claim 1, wherein the polymer having a polyoxyalkylene group is selected from polyoxyethylene glycol, polyoxypropylene glycol, polyoxyethylene polyoxypropylene glycol, polyoxyethylene methyl ether, polyoxypropylene butyl ether, polyoxyethylene lauryl ether, polyoxyethylene cetyl ether, polyoxyethylene oleyl ether, polyoxyethylene stearyl ether, polyoxyethylene tridecyl ether, polyoxyethylene myristyl ether, polyoxyethylene isostearyl ether, polyoxyethylene behenyl ether, polyoxyethylene octyldodecyl ether, polyoxyethylene cholesteryl ether, polyoxypropylene monomethyl ether, polyoxypropylene monoethyl ether, polyoxypropylene monopropyl ether, polyoxypropylene monobutyl ether, polyoxypropylene myristyl ether, polyoxypropylene cetyl ether, polyoxypropylene stearyl ether, polyoxypropylene lanolin ether, polyoxyethylene polyoxypropylene monobutyl ether, polyoxyethylene polyoxypropylene lauryl ether, polyoxyethylene polyoxypropylene cetyl ether, polyoxyethylene polyoxypropylene stearyl ether, polyoxyethylene polyoxypropylene decyltetradecyl ether, polyoxyethylene methylglucoside, polyoxypropylene methylglucoside, polyethylene glycol monolaurate, polyethylene glycol monooleate, polyethylene glycol monostearate, polyethylene glycol monomyristate, polyethylene glycol monoisostearate, polypropylene glycol monolaurate, polypropylene glycol monooleate, polyethylene glycol dilaurate, polyethylene glycol dipalmitate, polyethylene glycol dioleate, polypropylene glycol distearate, polyethylene glycol diisostearate, polypropylene glycol dilaurate, polyoxyethylene myristyl ether myristate, polyoxyethylene cetyl ether stearate, and polyoxyethylene stearyl ether stearate.

8. The adhesive sheet according to claim 1, wherein the polymer having a polyoxyalkylene group comprises a hydroxyl equivalent from 250 to 7,500 g/eq.

* * * * *